United States Patent [19]

Chew et al.

[11] Patent Number: 5,146,803
[45] Date of Patent: Sep. 15, 1992

[54] NONCIRCULAR ROLLING JOINTS FOR VIBRATIONAL REDUCTION IN SLEWING MANEUVERS

[75] Inventors: Meng-Sang Chew, Virginia Beach; Jer-Nan Juang, Poquoson, both of Va.; Li-Farn Yang, Boulder, Colo.

[73] Assignee: Administrator of the National Aeronautics and Space Administration, Washington, D.C.

[21] Appl. No.: 678,551

[22] Filed: Mar. 28, 1991

[51] Int. Cl.$^5$ ............... F16H 49/00; F16H 21/16
[52] U.S. Cl. ............................. 74/437; 74/25
[58] Field of Search ................. 74/25, 393, 437

[56] References Cited

U.S. PATENT DOCUMENTS

| | | | |
|---|---|---|---|
| 2,552,572 | 5/1951 | Mikina | 74/437 X |
| 2,700,285 | 1/1955 | Bellini | 74/437 |
| 2,861,635 | 11/1958 | Orr | 74/393 X |
| 2,957,363 | 10/1960 | Ingham et al. | 74/393 X |
| 3,178,959 | 4/1965 | Schwesinger | 74/437 |
| 3,301,244 | 1/1967 | Renshaw | 74/393 X |
| 3,606,795 | 9/1971 | Simons | 74/25 |
| 4,077,267 | 3/1978 | Schottler | 74/437 X |

Primary Examiner—Allan D. Herrmann
Attorney, Agent, or Firm—Kevin B. Osborne

[57] ABSTRACT

A rolling joint is provided for obtaining slewing maneuvers for various apparatuses including space structures, space vehicles, robotic manipulators and simulators. Two noncircular cylinders, namely a drive and a driven cylinder, are provided in driving contact with one another. This contact is maintained by two pairs of generally S-shaped bands, each pair forming a generally 8-shaped coupling tightly about the circumferential periphery of the noncircular drive and driven cylinders. A stationarily fixed arm extends between and is rotatably journalled with a drive axle and a spindle axle respectively extending through selected rotational points of the drive cylinder and of the driven cylinder. The noncircular cylinders are profiled to obtain the desired varying gear ratio.

13 Claims, 7 Drawing Sheets

NONCIRCULAR ROLLING JOINTS FOR VIBRATIONAL REDUCTION IN SLEWING MANEUVERS

ORIGIN OF THE INVENTION

The invention described herein was made jointly in the performance of work under NASA Grant No. NAG-1-830 and an employee of the United States Government. In accordance with 35 U.S.C. 202, the grantee elected not to retain title.

BACKGROUND OF THE INVENTION

1. Technical Field of the Invention

The present invention relates generally to structure maneuvering and more particularly to a control apparatus for slewing maneuvers of flexible structures.

2. Discussion of the Related Art

It is often desired to actuate a flexible structure in a slewing maneuver. Example applications include robot links manipulators such as the Remote Manipulator System (RMS), solar panels, actual and simulated space structures, etc. Several gearing devices have been used for transmitting the actuator torques to maneuver flexible structures during a given operation and in general these gearing devices have the shared drawback of non-varying gear ratios. A constant gear ratio is the consequence of using circular gears having proportional circumferences. In applications where gear rotational space is at a premium, a constant ratio imposes a significant spatial requirement.

A gear train, which is made of a series of circular gears, magnifies the torque of the actuator at a given constant gear ratio. The gear train can be accompanied by a roller chain or belt drive for transmitting the torque over a distance. This configuration results in undesirable backlash and suffers from excessive inertia and friction. A harmonic drive provides for very high gear-ratios to result in high drive torques with very low backlashes. However, this drive also has a constant gear ratio.

Special linkage, direct drive mechanisms can replace the role of the complex gear train or roller chain drives in robot manipulators. Two kinds of direct-drive mechanisms have been extensively used for the rigid-body robots, namely a four-bar parallel linkage and a five-bar polygon-type linkage. The direct-drive linkages are driven by two actuators located in parallel or in series, directly transmit the torques to the manipulators instead of through gear trains or roller chains, so that the actuator torques are decoupled through the direct-drive mechanisms to simplify the rather complicatedly coupled multi-body dynamics that mutually interact during the control process. The linkages of these direct drive mechanisms generate considerable inertia which must be considered in the dynamics of, e.g., robots. Also, gravity can effect these linkages and accordingly necessitates a more complicated control system. Finally, these linkages occupy a considerable amount of precious work space.

OBJECTS OF THE INVENTION

It is accordingly an object of the present invention to accomplish slewing maneuvers for various apparatuses.

It is another object of the present invention to achieve such a slewing maneuver without a constant gear ratio.

It is a further object of the present invention to avoid excessive inertia and friction while performing a slewing maneuver.

It is yet another object of the present invention to avoid backlash while performing a slewing maneuver.

It is a further object of the present invention to accomplish the foregoing objects with a simple control system.

It is another object of the present invention to accomplish the foregoing objects while reducing spatial requirements.

It is a further object of the present invention to achieve gearing with very low friction.

Additional objects and advantages of the present invention are apparent from the specification and drawings.

SUMMARY OF THE INVENTION

The foregoing and additional objects are obtained by a noncircular rolling joint according to the present invention. Two noncircular cylinders, namely a drive and a driven cylinder, are provided in driving contact with one another. This contact is maintained by two pairs of generally S-shaped bands, each pair forming a generally 8-shaped coupling tightly about the circumferential periphery of both the noncircular drive and driven cylinder. A stationarily fixed arm extends between a drive axle and a spindle axle respectively extending through rotational points of the drive cylinder and of the driven cylinder. The noncircular cylinders are profiled to obtain the desired constantly changing gear ratio while acting as if they are noncircular gears with very low friction.

DETAILED DESCRIPTION OF THE INVENTION

Figure 1:
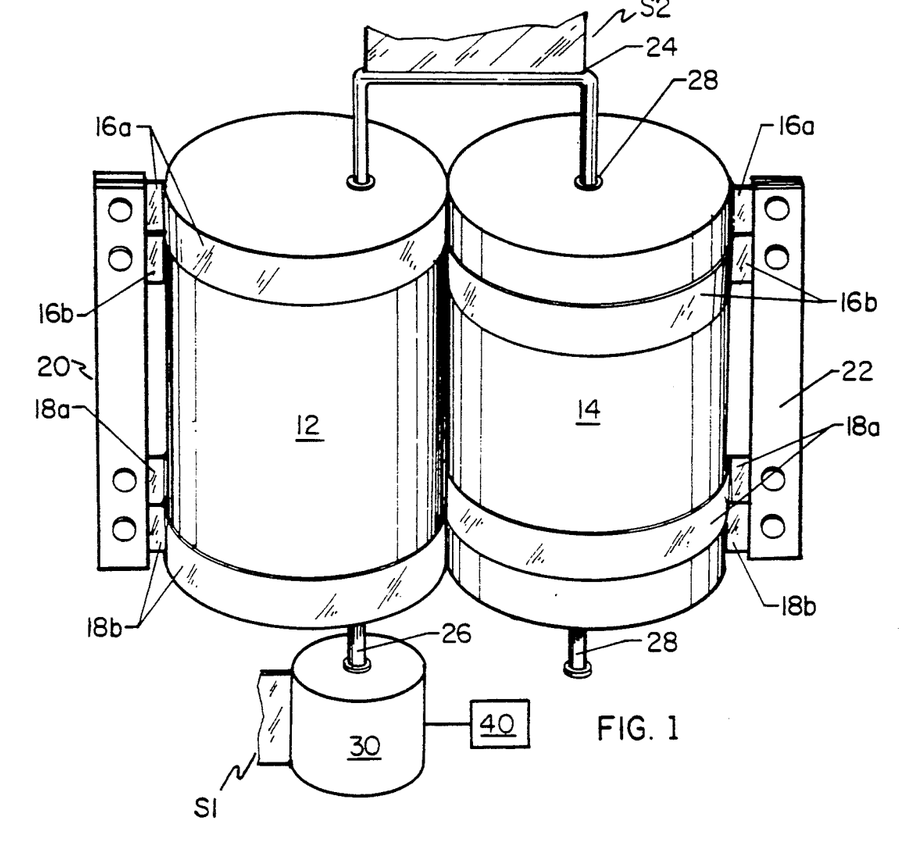
FIG. 1 is a perspective view of an apparatus for slewing maneuvers utilizing a noncircular rolling joint according to the present invention.
Figure 2:
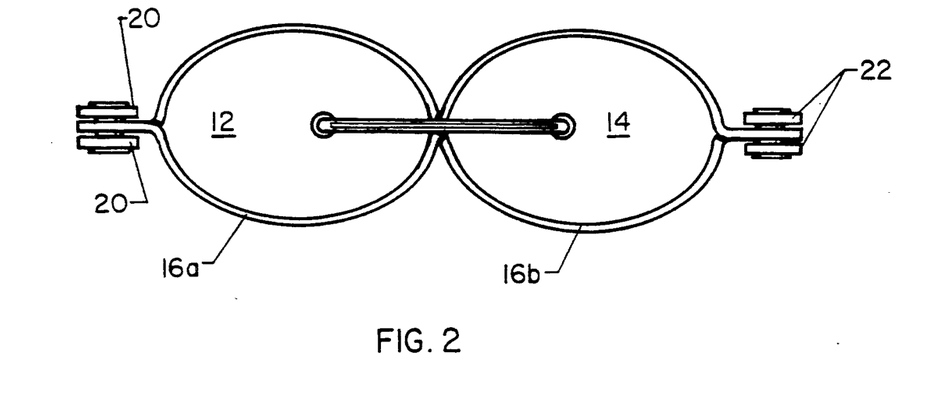
FIG. 2 is a top view of the embodiment of FIG. 1.

Referring to FIGS. 1 and 2, an apparatus 10 including a rolling joint is shown for achieving slewing maneuvers. The applications of the apparatus span a wide variety of uses including space structures, space vehicles, robotic manipulators, and simulators. Two specially shaped cylinders are provided in the form of noncircular, convex cylinders 12 and 14, discussed in greater detail below. Rather than employing intermeshed gear teeth, the noncircular cylinders 12 and 14 have generally smooth circumferential peripheries which are contacted so as to permit relative rolling contact via four S-shaped thin metal bands. This results in relatively low friction losses. An upper pair of bands 16a and 16b are fitted, one above the other, around upper portions of noncircular cylinders 12 and 14 such that the bands are oppositely oriented, i.e., the two bands would form a figure 8 when viewed from above, as shown in FIG. 2. A lower pair of bands 18a and 18b are fitted around lower portions of the noncircular cylinders in a similar manner. The respective opposite ends of the four S-shaped bands 16a, 16b, 18a, and 18b are clamped by respective clamps 20 and 22 which flank noncircular cylinders 12 and 14. The S-shaped bands couple the two noncircular cylinders together such that the rotation of one cylinder, e.g., cylinder 12, designated as the driving cylinder, will cause the rotation of the other cylinder, e.g., cylinder 14, designated as the driven cylinder. The bands are thin enough to permit sufficient rolling contact between the cylinder outer surfaces for driving and flexible enough to maintain this contact while being deformed during the driving of the noncircular cylinders.

Figure 5:
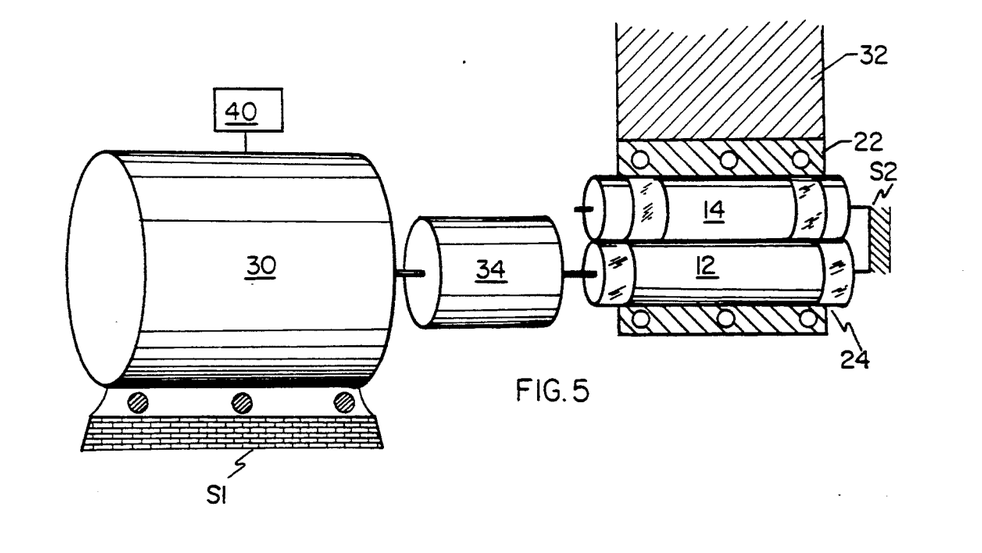
FIG. 5 is a side view of slewing maneuver apparatus for manipulating a flexible beam.
Figure 6:
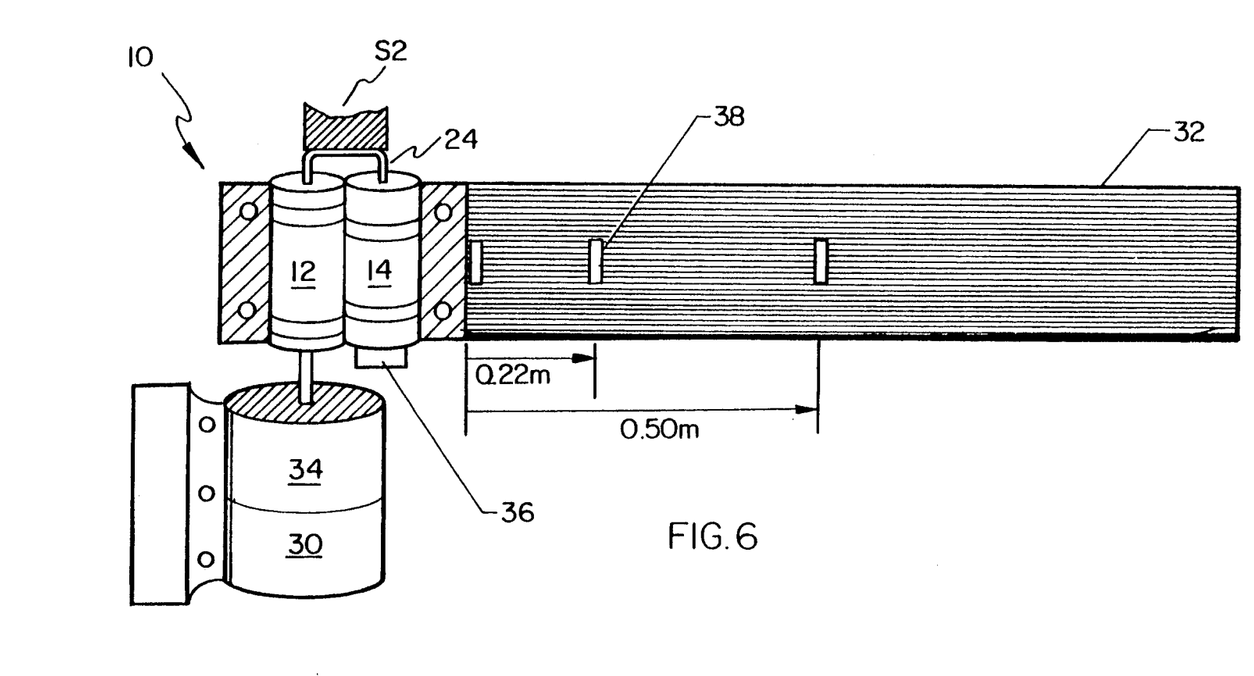
FIG. 6 is a side view of another embodiment of the present invention.

When the profiles of the two noncircular cylinders 12 and 14 are properly generated as detailed below, pure rolling contact exists between the cylinders. A stationarily fixed, sufficiently rigid connecting arm 24 is provided to rotatably journal drive axle 26 and spindle axle 28 respectively passing through selected rotational points of noncircular cylinders 12 and 14. Arm 24 holds the noncircular cylinders 12 and 14 together such that the distance between the two rotational points remains constant during the rotations of cylinders. As shown in FIG. 1, both motor 30 and rigid connecting arm 24 are respectively connected to stationary structures S1 and S2. Accordingly, driven noncircular cylinder 14 will be rotated about spindle axle 28 as drive cylinder 12 is rotated. This rotation is achieved by coupling a drive motor 30 to one of the cylinder axles, e.g., axle 26 of driving cylinder 12. When one noncircular cylinder rotates relative to the other, a varying ratio develops between the cylinders, resulting in a nonlinear transformation of the actuator torque for motor 30 to a flexible structure 32 (FIG. 5) mounted to the clamp, e.g., clamp 22, of the driven cylinder, e.g., cylinder 14, as shown in FIGS. 5 and 6.

Figure 3:
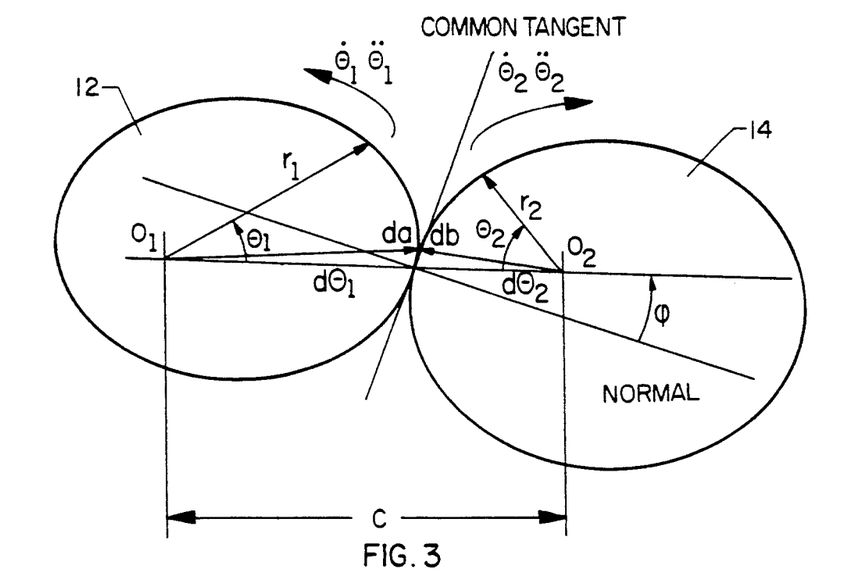
FIG. 3 is a geometric representation of the formation of the two noncircular cylinders of the rolling joint.

The convex profiles of the noncircular cylinders 12 and 14 shown in FIGS. 1 and 2 are determined according to geometric relationships shown in FIG. 3 and may or may not include elliptical profiles. If a varying hyperbolic gear ratio $N_g(\theta_2)$ is defined as a function of the output angle of rotation $\theta_2$ of the driven cylinder 14, then:

$$N_g(\theta_2) = \frac{\dot{\theta}_2}{\dot{\theta}_1} = \frac{r_1}{r_2} \quad (1)$$

where $r_1$ and $r_2$ are the respective pitch radii of driving cylinder 12 and driven cylinder 14 and $\dot{\theta}_1$ and $\dot{\theta}_2$ are the respective angular velocities of driving cylinder 12 and driving cylinder 14. The center distance C between the cylinders, i.e., the length of arm 24, is a constant and must satisfy:

$$r_1 + r_2 = C. \quad (2)$$

This constant distance ensures smooth rolling between the two noncircular cylinders. If this distance varies, undesirable sliding could occur between the cylinder faces.

From equations (1) and (2), the respective pitch radii $r_1$ and $r_2$ of the two noncircular cylinders can be shown to be:

$$r_1 = \frac{C N_g(\theta_2)}{[1 + N_g(\theta_2)]}, \text{ and } r_2 = \frac{C}{[1 + N_g(\theta_2)]}. \quad (3)$$

The input angle $\theta_1$ of the driving cylinder 12 can be computed by integrating equation (1) as follows:

$$\theta_1 = \int_0^{\theta_2} \left[ \frac{1}{N_g(\theta_2)} \right] d\theta_2. \quad (4)$$

Figure 4A:
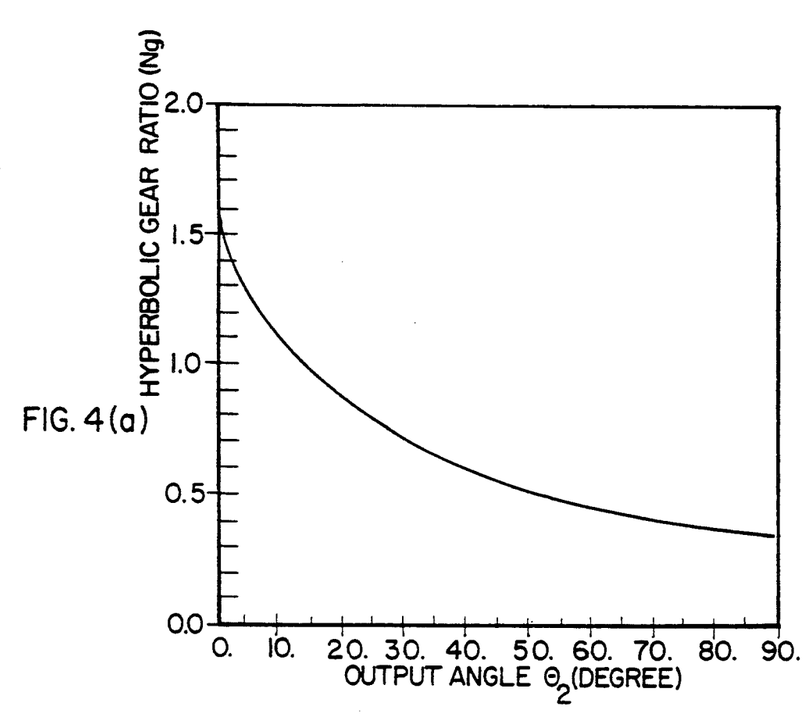
FIG. 4(a) is a graph showing the correlation between the hyperbolic gear ratio of the two noncircular cylinders and the output angle of the driven noncircular cylinder.
Figure 4B:
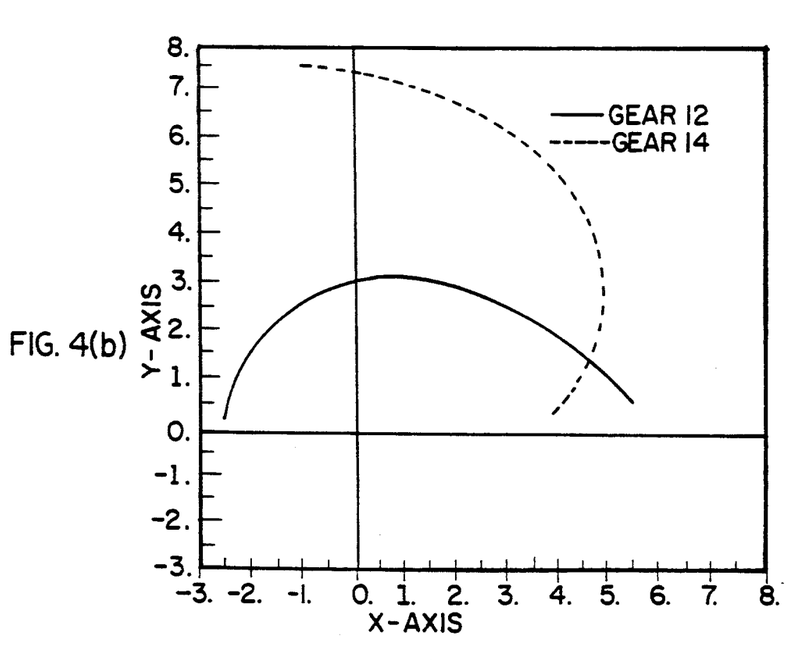
FIG. 4(b) is a graph showing the pitch curves of the two noncircular cylinders generated for the hyperbolic gear ratio of FIG. 4(a)

The pitch curves of the two noncircular cylinders can then be determined from equations (3) and (4). As an example, the pitch curves of the noncircular cylinders based on a hyperbolic gear ratio shown in FIG. 4(a) for the range of 0°–90° of output rotation, are plotted in FIG. 4(b). The convexities of the two pitch curves confirm the feasibility of the hyperbolic gear ratio for generating the profiles of these noncircular cylinders.

FIG. 5 shows how a flexible beam or structure 32 is driven by the motor 30. Specifically, structure 32 is connected to clamp 22 of driven cylinder 14 which is connected to drive cylinder 12 via the S-shaped clamps. A step-down gear box 34 is provided between the motor 30 and the drive cylinder 12. The motor 30 may be modeled by a standard armature circuit which is governed by the following differential equation:

$$I_m \ddot{\theta}_1 + \left( C_v + \frac{K_t K_b}{R_a} \right) \dot{\theta}_1 + \tau_a = \frac{K_t e_a}{R_a} \quad (5)$$

where $I_m$ denotes the motor inertia; $C_v$ viscous drag coefficient; $K_t$ motor torque constant; $K_b$ back-EMF constant; $R_a$ armature resistance; $\theta_1$ output motor angle, $\dot{\theta}_1$ the output angular velocity; $\ddot{\theta}_1$ the output angular acceleration; $e_a$ applied voltage for the armature; and $\tau_a$ available torque from the motor shaft. The available torque $\tau_a$ in equation (5) is then transformed to the driving torque $\tau_s$ through a step-down gear box ratio $N_p$ as well as the gear ratio $N_g$ of the noncircular cylinders, so that:

$$\tau_a = N_g N_p \tau_s \quad (6)$$

where $N_p$ is the constant gear ratio of a step-down gear box 34, and $\tau_s$ is the input torque for the flexible-link structure 32. Since the gear ratio in equation (1) is varying as a result of the noncircular shapes of the cylinders, the input/output relationship between the driving and driven cylinders is governed by a nonlinear transformation as follows:

$$\begin{pmatrix} \theta_1 \\ \dot{\theta}_1 \end{pmatrix} = \begin{pmatrix} \frac{1}{N_g(\theta_2)} & 0 \\ -\frac{\dot{N}_g(\theta_2)}{N_g^2(\theta_2)} & \frac{1}{N_g(\theta_2)} \end{pmatrix} \begin{pmatrix} \theta_2 \\ \dot{\theta}_2 \end{pmatrix}. \quad (7)$$

Substituting equations (6) and (7) into equation (5), the driving torque, i.e., the structural output $\tau_s$, is obtained and expressed by:

$$\tau_s = \frac{K_t}{(R_a N_g N_p)} \theta_a - \frac{\left(C_v + \frac{K_t K_b}{R_a}\right)}{(N_g N_p)^2} \dot{\theta}_2 + \quad (8)$$

$$\frac{I_m}{(N_g N_p)^3} (N_g N_p \ddot{\theta}_2 - \dot{N}_g N_g \dot{\theta}_2)$$

The time rate-of-change of the gear ratio $N_g$ in equation (8) can be computed by:

$$\dot{N}_g = \left[\frac{dN_g}{d\theta_2}\right] \dot{\theta}_2. \quad (9)$$

The input voltage across the actuator $e_a$ in equation (8) is generated according to the active feedback controller and the varying noncircular cylinder ratio, $N_g$, for driving the flexible link and for suppressing the flexural vibrations. Therefore, the interaction between the noncircular cylinders and controller design must be considered together from the perspective of an integrated design process.

FIG. 6 shows a planar flexible beam 32 attached to the noncircular cylinder device 10. Slewing control of this single beam is then implemented and the flexural vibrations of the beam are reduced by taking into account the profile design of the noncircular cylinders and an optimizer and output feedback controller 40 (FIGS. 1 and 5) together at the design stage. Optimizer and controller 40 is employed to determine the pitch curves of the noncircular cylinders as well as the output feedback gains of motor 30 that will minimize the vibrational amplitudes. A potentiometer 36 may be optionally attached to driven cylinder 14 to verify the rotation angle $\theta_2$ for correlation and verification with the output angle. In addition, suitable testing devices such as strain gauges 38 can be attached to beam 32 for desired test procedures. The use of the noncircular cylinders results in a simple and robust controller design for maneuvering flexible links in robot manipulators or in flexible structures in space. An integrated approach to design both controller and noncircular cylinders for a slewing beam as shown in FIG. 6 is verified by the simulation results discussed below.

A simulation apparatus implemented for a 90°-slew maneuver of a planar flexible beam, whose slewing characteristics will be tuned through the application of the noncircular cylinder device, are now described. The output feedback gains, which are needed to accomplish the control task of positioning the beam 32 while simultaneously suppressing the flexural vibrations therein, are implemented together with the pair of specially designed noncircular cylinders 12 and 14. A desired hyperbolic curve is obtained to generate the necessary varying gear ratio so that the convexity of cylindrical profiles of the noncircular cylinders is determined. The simulation results illustrate that the noncircular cylinders are capable of tuning the large-angle slew characteristics of a flexible beam while reducing the amplitudes of the flexural vibrations. The integrated design of a mechanical device, along with the control, is thus achieved for the large-angle slew maneuver of the flexible structure in the following simulation.

Figure 7:
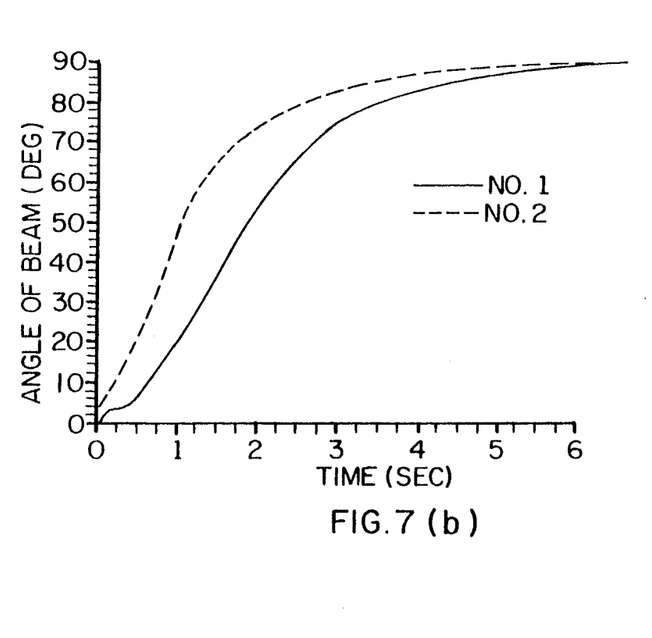
FIG. 7(a) is a graph correlating the angular velocity with time for slewing maneuvers accomplished by a conventional circular gear configuration and a non-circular cylinder configuration according to the present invention.
FIG. 7(b) is a graph correlating the slew angle with time for these two configurations.
FIG. 7(c) is a graph correlating the control torque with time for these two configurations.
FIGS. 7(d)–(f) respectively graph the correlation between time and vibrational modes 1, 2, and 3 of the slewed structure for these two configurations.

Two simulation results are compared: one with two conventional circular gears, and another with the integrated design of two noncircular cylinders with output feedback gains. The performance results associated with noncircular cylindering are indicated by a solid line (ḥ1) and the results for the conventional circular gearing are indicated by the dashed line (ḥ2) for a 90° slew maneuver in FIGS. 7(a)-7(b). The flexible steel beam slews 90.0 degrees in 6.0 sec as shown in FIG. 7(a). The noncircular cylinders as described herein apparently slows down the beam slewing during the first seven degrees of rotation, thereby providing a smoother initial actuation to the desired final angle than that in the presence of the circular gears. In FIG. 7(b), the beam angular velocities damp out in approximately 6.0 seconds for both configurations. The higher modes are clearly observed in the results using circular gears while nearly absent in the results for noncircular cylinders, indicating an efficient suppression of structural vibration by the noncircular cylinders. The slewing angular velocity of noncircular cylinders illustrates a smoother trajectory after 0.8 sec which implies that the beam slewing and vibrational motion have been turned down through the use of the noncircular cylinders. Moreover, the peak angular velocity magnitude is also significantly reduced by the use of noncircular cylinders.

Figure 7C:
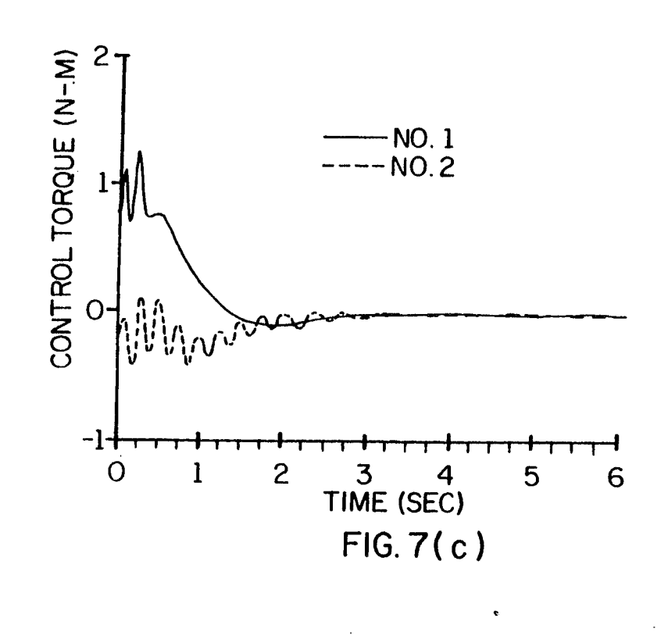

The control torques start with 1 Nm and vanish quite rapidly as shown in FIG. 7(c). It can therefore be implied that the control torque in the presence of noncircular cylinders damps out the flexural vibrations faster than that for circular gears. Also, the vibrational modes are significantly lower for the noncircular cylindering, as shown in FIG. 7(c).

Figure 7D:
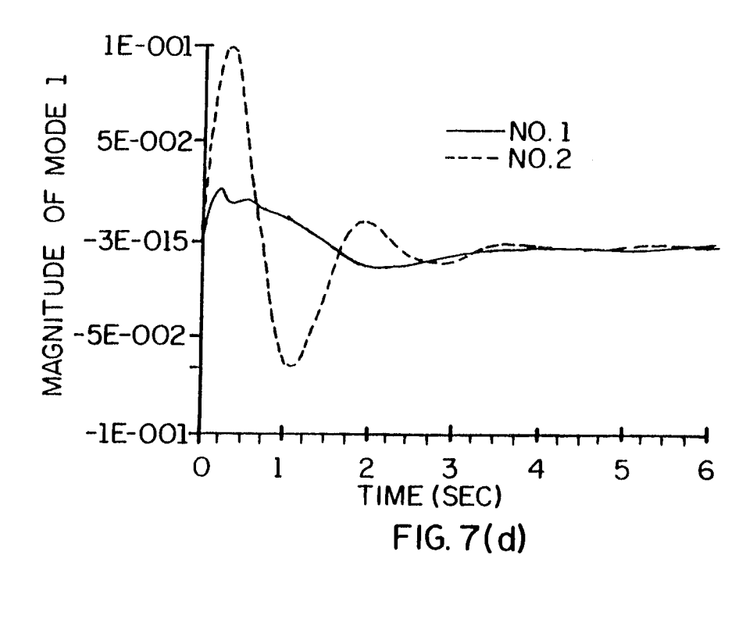
Figure 7E:
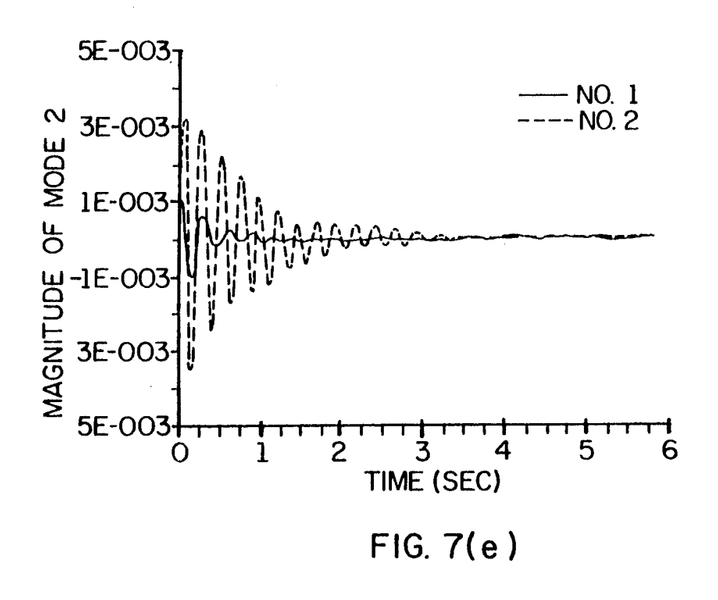
Figure 7F:
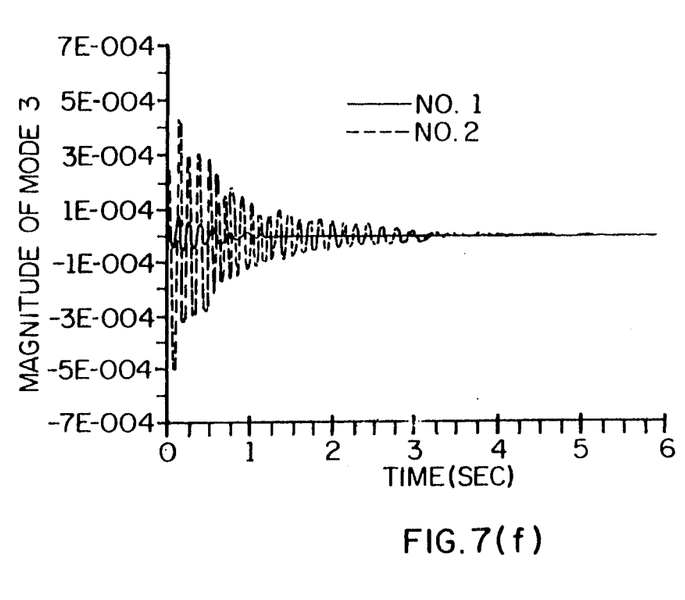

The behaviors of the first three modes are demonstrated in FIGS. 7(d)-7(f). The vibrational modes can be suppressed by output feedback control in the case of circular gears and are further suppressed through noncircular cylinders in conjunction with feedback control. As can be seen in FIG. 7(d), the noncircular cylinders suppress the first mode more than circular gears do. At 0.3 sec, the first mode with circular gears produces a peak amplitude of 0.1 units compared to 0.028 units with noncircular cylinders. FIG. 7(e) shows two case histories of the second mode. The peak amplitude of each mode is considerably reduced, with noncircular cylinders contributing to vibrational suppression of the second mode even more than with circular gears. A similar situation happens in the behavior of the third mode. FIG. 7(f) shows that a smaller amplitude of the third mode is achieved by noncircular cylinders. The simulation results in FIGS. 7(a)-7(f) thus demonstrate the improved results of the present invention in conducting the slewing maneuvers of a planar flexible beam in the presence of mechanical devices such as noncircular cylinders.

The slewing apparatus 10 in conjunction with a simple cooperative controller, is capable of tuning the large angle slewing characteristics of flexible beams so that the flexural motions of the beams can be considerably reduced. In addition, the mechanical cooperation between the two noncircular cylinders requires no gear teeth, thereby eliminating any potential teeth interlocking or backlash. Also, lubrication is not required. The S-shaped bands form a nonslipping, low friction connection between the two noncircular cylinders.

In addition, noncircular toothed gears can also be employed with the present invention and are embraced by the general term cylinders as used in the present specification. The profiles of the two gear circumferences are generated as described herein. The presence of gear teeth eliminates the need for the S-shaped bands and associated clamps.

Many modifications, substitutions and improvements will be apparent to the skilled artisan without departing from the spirit and scope of the present invention as described in the specification and drawings and defined in the following claims. For example, the rolling joint according to the present invention can be expanded to embrace numerous noncircular cylinders in a gear train.

What is claimed is:

1. A rolling joint comprising:
   a noncircular, nonelliptical drive cylinder having a drive axle passing through a rotational point of said drive cylinder;
   a noncircular, nonelliptical driven cylinder having a spindle axle passing through a rotational point of said driven cylinder;
   a stationarily fixed arm connected end to end between the drive axle and the spindle axle to maintain a constant distance between the respective rotational points of the drive and driven cylinders, the drive axle and spindle axle rotatably journalled to said arm; and
   means for maintaining contact between the circumferential peripheries of said drive and driven cylinders to permit said driven cylinder to be rolled relative to said drive cylinder,
   wherein said drive cylinder is profiled such that its pitch radius $r_1$ is substantially defined as:

$$r_1 = \frac{CN_g(\theta_2)}{[1 + N_g(\theta_2)]},$$

where C is the distance between the respective rotational points of said drive cylinder and said driven cylinder, and $N_g(\theta_2)$ is the varying gear ratio between said drive cylinder and said driven cylinder defined as a function of the output angle of rotation $\theta_2$ of said drive cylinder, and
   wherein said driven cylinder is profiled such that its pitch radius $r_2$ is substantially defined as $$r_2 = \frac{C}{[1 + N_g(\theta_2)]}.$$

2. The rolling joint of claim 1, wherein said means for maintaining contact comprises a pair of generally S-shaped bands, the pair of S-shaped bands being placed one above the other to form a generally 8-shaped coupling tightly about the circumferential periphery of said noncircular drive and driven cylinders.

3. The rolling joint according to claim 2, further comprising two clamps, each clamp clamping a respective end of both S-shaped bands to maintain contact between said noncirular drive cylinder and said noncircular driven cylinder.

4. The rolling joint according to claim 2, wherein said means for maintaining contact further comprises another pair of generally S-shaped bands, the other pair of S-shaped bands being placed one above the other for forming another generally 8-shaped coupling tightly about the circumferential periphery of said noncircular drive and driven cylinders.

5. The rolling joint according to claim 4, further comprising two clamps, each clamp clamping a respective end of each S-shaped band of both pairs of S-shaped bands.

6. The rolling joint according to claim 1, further comprising a drive motor connected to the drive axle for driving said noncircular drive cylinder.

7. The rolling joint according to claim 6, further comprising a step down gear box connected between the motor and the drive axle of said noncircular drive cylinder.

8. A rolling joint comprising:
   a noncircular drive cylinder having a drive axle passing through a rotational point of said drive cylinder;
   a noncircular driven cylinder having a spindle axle passing through a rotational point of said driven cylinder;
   a stationarily fixed arm connected end to end between the drive axle and the spindle axle to maintain a constant distance between the respective rotational points of the noncircular drive and driven cylinders, the drive axle and spindle axle rotatably journalled to said arm; and
   means for maintaining contact between the circumferential peripheries of said noncircular drive and driven cylinders to permit said noncircular driven cylinder to be rolled relative to said noncircular drive cylinder, comprised of a pair of generally S-shaped bands, the pair of S-shaped bands being placed one above the other to form a generally 8-shaped coupling tightly about the circumferential periphery of said noncircular drive and driven cylinders,
   wherein said noncircular drive cylinder is profiled such that its pitch radius $r_1$ is substantially defined as:

$$r_1 = \frac{CN_g(\theta_2)}{[1 + N_g(\theta_2)]},$$

where C is the distance between the respective rotational points of said noncircular drive cylinder and said noncircular driven cylinder, and $N_g(\theta_2)$ is the varying gear ratio between said noncircular drive cylinder and said noncircular driven cylinder defined as a function of the output angle of rotation of said noncircular drive cylinder, and
   wherein said noncircular driven cylinder is profiled such that its pitch radius $r_2$ is substantially defined as $$r_2 = \frac{C}{[1 + N_g(\theta_2)]}$$

9. The rolling joint according to claim 8, further comprising two clamps, each clamp clamping a respective end of both S-shaped bands to maintain contact between said noncircular drive cylinder and said noncircular driven cylinder.

10. The rolling joint according to claim 8, wherein said means for maintaining contact further comprises another pair of generally S-shaped bands, the other pair of S-shaped bands being placed one above the other forming another generally 8-shaped coupling tightly about the circumferential periphery of said noncircular drive and driven cylinders.

11. The rolling joint according to claim 10, further comprising two clamps, each clamp clamping a respective end of each S-shaped band of both pairs of S-shaped bands.

12. The rolling joint according to claim 8, further comprising a drive motor connected to the drive axle for driving said noncircular drive cylinder.

13. The rolling joint according to claim 12, further comprising a step down gear box connected between the motor and the drive axle of said noncircular drive cylinder.

* * * * *